(12) United States Patent
Takahashi

(10) Patent No.: US 7,878,509 B2
(45) Date of Patent: Feb. 1, 2011

(54) MECHANICAL SEAL DEVICE

(75) Inventor: Hidekazu Takahashi, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 423 days.

(21) Appl. No.: 11/660,745

(22) PCT Filed: Aug. 26, 2005

(86) PCT No.: PCT/JP2005/015559

§ 371 (c)(1),
(2), (4) Date: Feb. 22, 2007

(87) PCT Pub. No.: WO2006/022378

PCT Pub. Date: Mar. 2, 2006

(65) Prior Publication Data

US 2008/0093806 A1    Apr. 24, 2008

(30) Foreign Application Priority Data

Aug. 26, 2004   (JP)   ............... 2004-247313

(51) Int. Cl.
*F16J 15/34*  (2006.01)

(52) U.S. Cl. .............. 277/359; 277/360; 277/370; 277/372; 277/390; 277/408

(58) Field of Classification Search ......... 277/358–360, 277/370, 371, 390, 394, 408
See application file for complete search history.

(56) References Cited

U.S. PATENT DOCUMENTS

| | | | | |
|---|---|---|---|---|
| 2,844,393 A * | 7/1958 | Jensen | ............... | 277/394 |
| 4,448,428 A * | 5/1984 | Marsi | ............... | 277/404 |
| 4,509,762 A * | 4/1985 | Garrett | ............... | 277/398 |
| 5,344,164 A * | 9/1994 | Carmody et al. | ............... | 277/371 |
| 5,577,738 A | 11/1996 | Fukuda | | |
| 5,893,564 A * | 4/1999 | Yang | ............... | 277/374 |
| 6,932,348 B2 * | 8/2005 | Takahashi | ............... | 277/359 |
| 6,935,632 B2 * | 8/2005 | Azibert et al. | ............... | 277/370 |
| 2003/0042683 A1 | 3/2003 | Takahashi | | |

(Continued)

FOREIGN PATENT DOCUMENTS

EP   1 288 541 A2   3/2003

(Continued)

*Primary Examiner*—Shane Bomar
*Assistant Examiner*—Gilbert Y Lee
(74) *Attorney, Agent, or Firm*—Arent Fox LLP

(57) ABSTRACT

A mechanical seal has a seal cover attached to an outer surface of a device body, a fitting surface through which a shaft is insertable, and defines a space further away from a machine than the fitting surface. A quenching path penetrates the space and supplies quenching fluid therein. A first seal ring has a movement surface fitted to the fitting surface and a seal surface inward of the space section. A second seal ring has a relative slide seal surface in tight contact with the seal surface of the first seal ring and a seal surface that faces a restriction surface. A seal collar holds the second seal ring in a sealed state and is sealingly fixed to the shaft. A packing is in tight contact with the seal surface of the second seal ring and the restriction surface to prevent quenching fluid from leaking out of the machine.

4 Claims, 6 Drawing Sheets

U.S. PATENT DOCUMENTS

2004/0169336 A1* 9/2004 Azibert et al. .............. 277/370
2005/0242516 A1* 11/2005 Azibert et al. .............. 277/370

FOREIGN PATENT DOCUMENTS

| | | |
|---|---|---|
| JP | 61-50862 | 4/1986 |
| JP | 61-149670 | 7/1986 |
| JP | 2003-074713 | 3/2003 |
| WO | WO 89/08798 | 9/1989 |

* cited by examiner

MECHANICAL SEAL DEVICE

CROSS-REFERENCE TO RELATED APPLICATION

This application is a National Stage entry of International Application No. PCT/JP2005/015559, filed Aug. 26, 2005, the entire specification claims and drawings of which are incorporated herewith by reference.

TECHNICAL FIELD

The present invention relates generally to a mechanical seal device which enjoys a simple construction and is able to provide a cooling for the sliding seal faces of a mechanical seal. More particularly, the invention relates to a mechanical seal device of a cartridge type which is suitable for effecting a seal against highly viscous sealed fluid, slurry contained sealed fluid, sealed fluid made of chemical liquid or the like and prevents solid matters contained in the sealed fluid from being stuck on the sliding faces of the seal ring or from being trapped between the seal members to cause a generation of sliding frictional heat.

BACKGROUND ART

A mechanical seal device needs to have a simple construction and be straightforward for assembly/disassembly/inspection because it is applied to a mass-produced or massively processed apparatus such as automobiles or chemical devices. Additionally, a mechanical seal device needs to possess a construction achieving a cost reduction. Also a mechanical seal device needs to be able to prevent a sealed fluid from causing a frictional heat generation on the sliding seal faces of seal rings in order to provide a seal against the sealed fluid like oil or chemical liquid. Being motivated by such a background, there have been recent demands for improvements of the mechanical seal device such as simplification of construction thereof, prevention of heat generation at sliding seal faces, enhancement of seal ability of sliding seal faces, packing, O-rings and the like, and an easy inspection and maintenance.

Primary related art of the present invention is found as a mechanical seal device shown in FIG. 6 (for example, see Japanese Patents Laid-open Publication No. 2000-356270 or U.S. Pat. No. 5,213,340). FIG. 6 is a full sectional view of mechanical seal device 100 mounted to a casing 160. This mechanical seal device 100 is applicable to a shaft seal apparatus of a pump operating on chemical liquid or the like.

First, a construction of the mechanical seal device 100 is briefly described. In FIG. 6, the mechanical seal device 100 is of a cartridge type which enables easy installation thereof to an end face 160A of the casing 160 as well as providing a seal between the casing 160 and a rotary shaft 170 which extends through a bore hole of the casing 160. The mechanical seal device 100 contains a mechanical seal 102 therein as a primary component which consists of a stationary seal ring 103 and a rotary seal ring 110 the former of which is disposed in the inboard A of the casing 160. Other primary components include a casing main body 130 and a sleeve 120 in which the casing main body 130 retains a retainer member 106 for the stationary seal ring 103 as well as the stationary seal ring 103 of the mechanical seal 102 in the outboard B of the casing 160 while the sleeve 120 retains the rotary seal ring 110 of the mechanical seal 102 in the inboard A along the rotary shaft 170.

The rotary seal ring 110 is disposed in the bore hole formed within the inboard A of the casing 160. This rotary seal ring 110 is mounted on one end of a long sleeve 120 in order to be disposed deep inboard of the bore hole of the casing 160, whose inner circumferential surface 120C is fitted to the rotary shaft 170. The other outboard end of the sleeve 120 fits a retainer portion 125 and screw sockets 127 applied thereto secures the sleeve 120 against the rotary shaft 170. The rotary seal ring 110 and the sleeve 120 are connected with each other via a connecting member 129. O-rings 105C, 105C are provided for sealing on the respective fit surfaces between the rotary shaft 170 and the sleeve 120 as well as between the sleeve 120 and the connecting member 129. The sleeve 120 and the connecting member 129 are joined with each other by means of a drive pin 120P in a jointly rotatable manner. Further, the connecting member 129 and the rotary seal ring 110 also are joined with each other in a jointly rotatable manner by means of another drive pin which is disposed on the mating area therebetween, not specified by a reference numeral. O-ring 105B is provided for sealing at the mating surfaces between the connecting member 129 and the rotary seal ring 110.

The stationary seal ring 103, on the other hand, is retained by being securely fitted to a stepped annular surface which is disposed on one end portion of a cylindrical retainer member 106. The retainer member 106 fits the inner diameter surface of the casing main body 130 in freely slidable a manner along the axial direction. A fixture pin 132 which is disposed on the casing main body 130 permits the retainer member 106 to be retained in a non-rotatable manner. A seal for the mating faces between the retainer member 106 and the casing main body 130 is provided by means of O-ring 105A. The other end of the retainer member 106 securely mounts a spring receiving member 107.

The casing main body 130 abuts the end face 160A of the casing 160 and is secured relative to the casing 160 by means of fastening a nut 163A on stud bolts 163 which are disposed on the casing 160. A portion of the side wail of the casing main body 130 defines a stepped face 130A. A spring seating member 112 is mounted on the stepped face 130A by means of set screw members 119. A spring 109 supported by the spring seating member 112 is disposed between the spring seating member 112 and the spring receiving member 107, and provides a resilient urging force to the stationary seal ring 103 via spring receiving member 107 and the retainer member 106. The stationary seal ring 103 being urged by the spring 109 comes into a tight contact with the rotary seal ring 110 for effecting a seal against a sealed fluid. There is an installation groove 112G disposed on the inner circumferential surface of the spring receiving member 112. The installation groove 112G receives a spirally wound gasket 115. Seal face 115B of the gasket 115 comes to a sealing contact with the outer circumferential surface 120B of the sleeve 120.

In order to provide a cooling to the sliding faces of the rotary seal ring 110 and the stationary seal ring 103 in the mechanical seal 102 which is composed of the rotary seal ring 110, stationary seal ring 103 and their affiliated members, a flushing passage 140 is led to the outer circumferential side of the mechanical seal 102 while a quenching passage 141 is led to the inner circumferential side of the mechanical seal 102 in which both passages are configured through holes extending from the outer circumference surface of the casing main body 130 to inner circumferential surface thereof. The flushing passage 140 and the quenching passage 141, respectively, permit a flushing fluid (purified water) V1 and a quenching fluid (purified water) V2 to flow therethrough.

Therefore, the mechanical seal device 100 is so configured that the flushing passage 140 and the quenching passage 141 disposed in the casing main body 130 provide the flushing fluid V1 to the inner circumferential surface of the mechanical seal 102 and the quenching fluid V2 to the outer circumferential surface of the mechanical seal 102, respectively. This configuration finds it difficult that it is hard to provide an effecting cooling to a source of sliding frictional heat, i.e., the relatively opposing sliding faces of the rotary seal ring 103 and the stationary seal ring 103, from the outer circumferential side of a wide surface area. In particular, providing a cooling to the relatively opposing sliding seal faces from the inner circumferential side increases a danger of contaminating oil or chemical fluid located in the outer circumferential side with the quenching fluid. Installing the mechanical seal 102 being composed of quenching passage 140, flushing passage 141, rotary seal ring 110 and stationary seal ring 103 between the axially outboard end portion and inboard end portion of the sleeve 120 necessarily increases a length of the sleeve 120. Disposing the gasket 115 on the outboard end portion of the sleeve 120 and the O-rings 105C, 105C on the inboard end portion makes the sleeve 120 even longer and the sealing arrangement for installing the gasket 115 and O-rings 105A, 105C, 105C becomes complex.

More particularly, the O-rings 105C, 105C which are disposed more inwardly in the inboard A than the mechanical seal 102 are meant to provide a seal to prevent the quenching fluid V2 in the quenching passage 141 from breaking into the inboard A, and also a sealed fluid contained in the bore hole of the casing 160 needs to be blocked from breaking into the quenching passage 141, all of which necessarily increase the dimension as well as the complexity of the seal construction. Additionally, use of gasket 115 necessitates a disposition of a spring seating member 112 protruding from the end face of the casing main body 130 in which securing seal ability of the gasket 115 and the spring seating member 112 makes constructions thereof more complicated. Also the fact that the spring seating member 112 and the stationary seal ring 103 protrude from the both end faces of the mechanical seal device 100 imposes a difficulty on part management and control. Another difficulty is caused by such a construction that the stationary seal ring 103 is urged inwardly into the bore hole of the casing 160 by means of spring 109 and the rotary seal ring 110, on the other hand, is meant to be installed by means of adjusting outwardly the casing main body 130, which makes it difficult to adjust the rotary seal ring 110 and the stationary seal ring 103 as they are being installed.

The present invention is introduced to resolve the above mentioned problems. A primary technical goal which this invention tries to achieve is to provide the sliding seal faces of a mechanical seal with a cooling, cleansing and lubrication effect by means of a quenching fluid. Another goal is to make the construction of mechanical seal device simple and compact. Yet another goal is to make assembly, disassembly and maintenance tasks of the mechanical seal device straightforward.

DISCLOSURE OF THE INVENTION

A primary object of the present invention is to resolve the above mentioned technical problems, and a solution to such problems is embodied as follows.

A mechanical seal device of the present invention is a mechanical seal device for being provided in an apparatus main body mounting a shaft therethrough for effecting a seal on a circumference of said shaft. The mechanical seal device is comprised of a seal cover which is mounted on an outboard surface of the apparatus main body and has a fit surface to which the shaft is inserted and defines a cavity portion in an outboard side relative to the fit surface, a quenching passage which communicate with the cavity portion and feeds a quenching fluid to within the cavity portion, a reducing face which is disposed on the seal cover and is arranged in an annular form wherein the reducing face is located in the outboard side relative to the cavity portion, a first seal ring which retains a moveable face and a seal face wherein the moveable face is sealingly fitted with the fit surface of the seal cover in freely moveable a manner, wherein the seal-face is located within the cavity portion, a second seal ring which retains a relatively sliding seal face and a seal-tight face wherein the relatively sliding seal face is able to form a sealing contact with the seal face of the first seal ring wherein the seal-tight face is disposed on the outer circumference and faces against the reducing face, and a seal collar which retains the second seal ring in a seal-tight manner and is sealably secured to the shaft, wherein a packing is provided to prevent the quenching fluid from leaking outboard wherein the packing is in a seal-tight contact with the seal-tight face of the second seal ring and the reducing face of the seal cover.

According to the mechanical seal device related to the present invention, a quenching fluid (also referred to as quenching liquid in the following embodiments) supplied from a quenching passage provides an effective cooling to the outer circumferential surface of a mechanical seal by means of circulation thereof within a cavity chamber in which the quenching passage communicates with the cavity chamber which contains the outer circumference of the mechanical seal in surrounding relation. Moreover, a cooling effect can be achieved by providing a cooling via the outer circumference face side of the mechanical seal which is of a larger surface area than the inner circumference face side. Further, the quenching fluid supplied through the quenching passage exhibits a cleansing effect for the surrounding face of the mechanical seal. Also packing not only prevents the quenching fluid from escaping outboard from the cavity chamber but also defines a cavity chamber wherein both seal rings are widely surrounded. In particular, as the quenching fluid resides radially outward the first seal ring and second seal ring, a centrifugal force acted on the relatively opposing sliding faces therebetween effectively prevents the quenching fluid from breaking into a sealed fluid side, thereby no mixture with the sealed fluid will occur. In addition, since a pressure of the quenching fluid can be increased due to a secure sealing in the cavity chamber provided by the packing, contaminants trying to break into between the sliding seal faces or contact faces of the O-rings are forcibly pushed back by the high pressure to a low pressure side (opposite side), thereby is obtained outstanding seal performance for the seal face of the first seal ring relative to its mating sliding seal face. As a result, seal ability of the opposing seal faces is enhanced.

Next, preferred embodiments related to the present invention are described below.

In a mechanical seal device as a first embodiment of the present invention, the second seal ring comprises a contact face which is disposed axially opposite the relatively sliding seal face, and the seal collar comprises a retainer face which is configured so as to oppose against the contact face. An installation portion of the packing then is sandwiched between the contact face of the second seal ring and the retainer face of the seal collar wherein a seal contact face opposite the installation portion is arranged in a seal-tight contact with the reducing face, thereby providing a seal for the quenching fluid within the cavity portion.

According to the mechanical seal device of the first embodiment relative to the present invention, as the packing which is retained sandwiched in the outboard side of the second seal ring forms a seal-tight contact with the reducing face, the quenching fluid circulating within the annular groove securely provides a cooling and cleansing effect to the outer circumference of the second seal ring. This eliminates an installation part for the packing and makes the mechanical seal device compact. The packing, at the same time, effectively provides a seal against the quenching liquid due to the shut-off effect exhibited by the clearance between the reducing face and the seal contact face. Also in case of installing the mechanical seal device to an apparatus, assembly and disassembly of the mechanical seal device becomes extremely easy since the first seal ring is pre-installed inside the seal cover and the second seal ring is retained by the seal collar as a unit. Moreover, removing off the seal collar from the seal cover permits the first seal ring, second seal ring and packing to be taken out with ease, making a part replacement straightforward. Also the mechanical seal device is so unitized that no extra part is required for retaining a sleeve or packing. Therefore no member significantly protrudes in the axial direction and part management thereof becomes simple even when a great many mechanical seal devices are lined up in product control.

In a mechanical seal device as a second embodiment of the present invention, the second seal ring is disposed in the inner circumferential side of the reducing face and comprises a seal-tight face in which the seal-tight face and the reducing face forms a small clearance therebetween.

According to the mechanical seal device of the second embodiment relative to the present invention, as the second seal ring is disposed in the inner circumferential side of the reducing face and comprises a seal-tight face in which the seal-tight face and the reducing face forms a small clearance therebetween, a fluid remaining in the small clearance is pushed back to the inboard side for sealing when the second seal ring rotates while keeping the small clearance relative to the reducing face. The sealing effect is created as a result of sealing by the packing and the small clearance formed between the seal-tight face and the reducing face.

In a mechanical seal device as a third embodiment of the present invention, the packing comprises mount bore holes which are disposed in the installation portion of the packing and mate with the drive pins installed in the seal collar in a non-rotatable manner.

According to the mechanical seal device of the third embodiment relative to the present invention, as the packing comprises mount bore holes which are disposed in the installation portion of the packing and mate with the drive pins installed in the seal collar in a non-rotatable manner, rotation of the second seal ring does not drag the packing for accompanying rotation, thereby outstanding seal ability of the seal contact face is exhibited. In particular, since the packing is retained by means of the drive pins, axial thickness thereof can be decreased and radial length thereof can be made small as well. So the packing can be made compact, thereby effecting a smaller sliding resistance during the rotation.

In a mechanical seal device as a fourth embodiment of the present invention, the first seal ring fits the fit surface of the seal cover and is urged in the outboard direction by means of a resilient urging means in which the second seal ring fits the seal collar and the relatively sliding seal face of the second seal ring is sealably secured from the outboard side to the sliding seal face of the first seal ring.

According to the mechanical seal device of the fourth embodiment relative to the present invention, the first seal ring fits the fit surface of the seal cover and the second seal ring fits the seal collar and the relatively sliding seal face is sealably secured from the outboard side to the sliding seal face of the first seal ring. Therefore, the first seal ring is fittingly retained by the seal cover and installing the second seal ring from the outboard side simply completes assembly thereof to the first seal ring. This, reversely, makes disassembly of the mechanical seal device easy for part replacement.

BEST MODE FOR CARRYING OUT THE INVENTION

Described below is the details of the figures of a preferred embodiment in accordance with the principles of the present invention. All the figures explained below are constructed according to actual design drawings with accurate dimensional relations.

Figure 1:
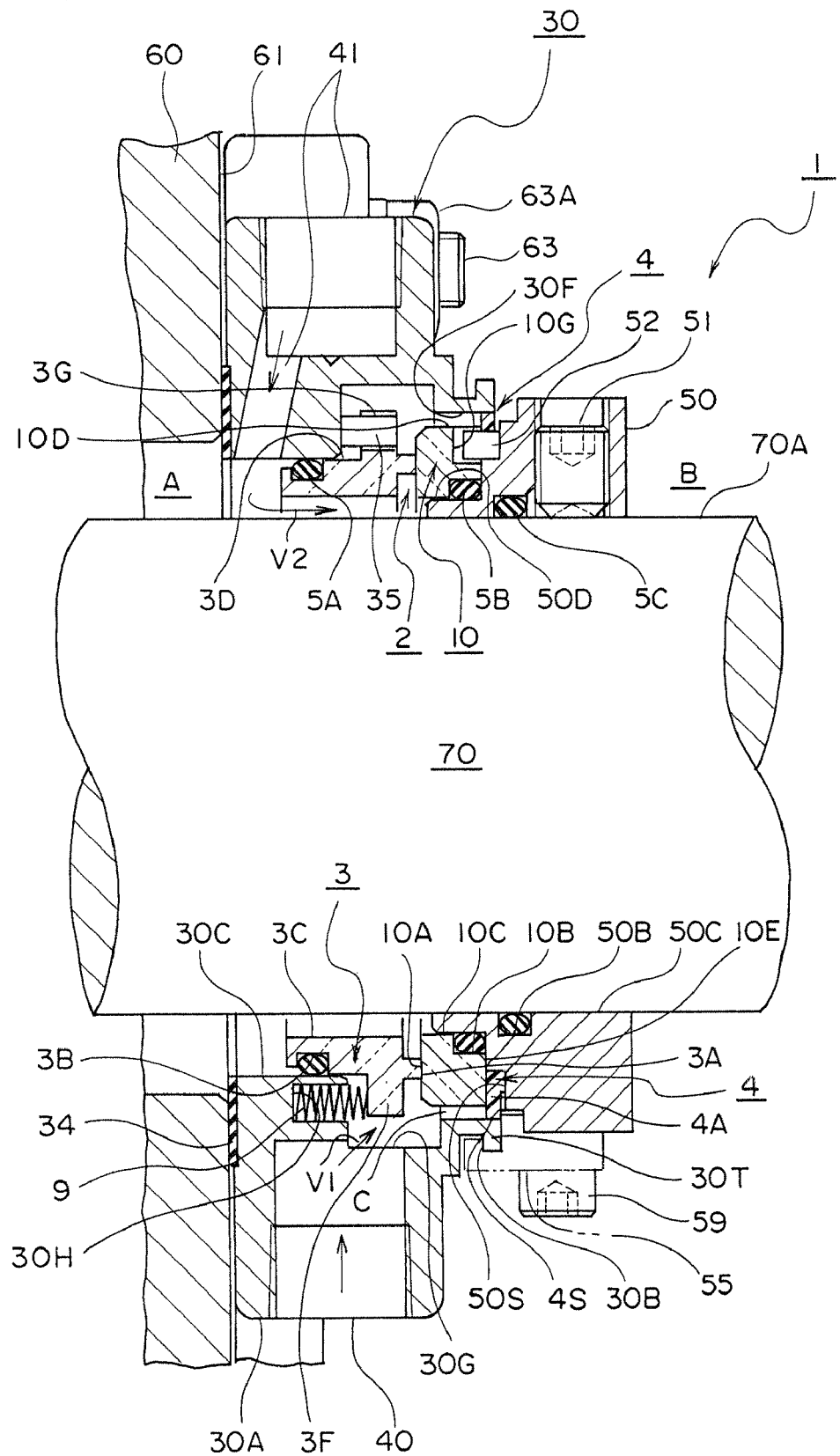
FIG. 1 is a full cross sectional view of a mechanical seal device as a first embodiment related to the present invention.
Figure 2:
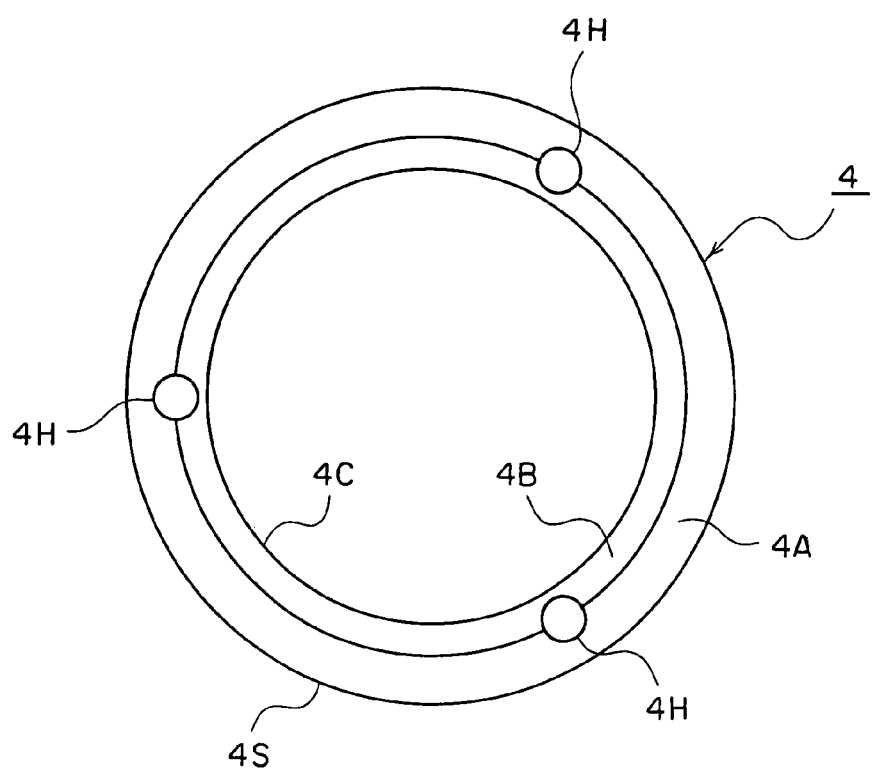
FIG. 2 is a front view of the packing shown in FIG. 1.
Figure 5:
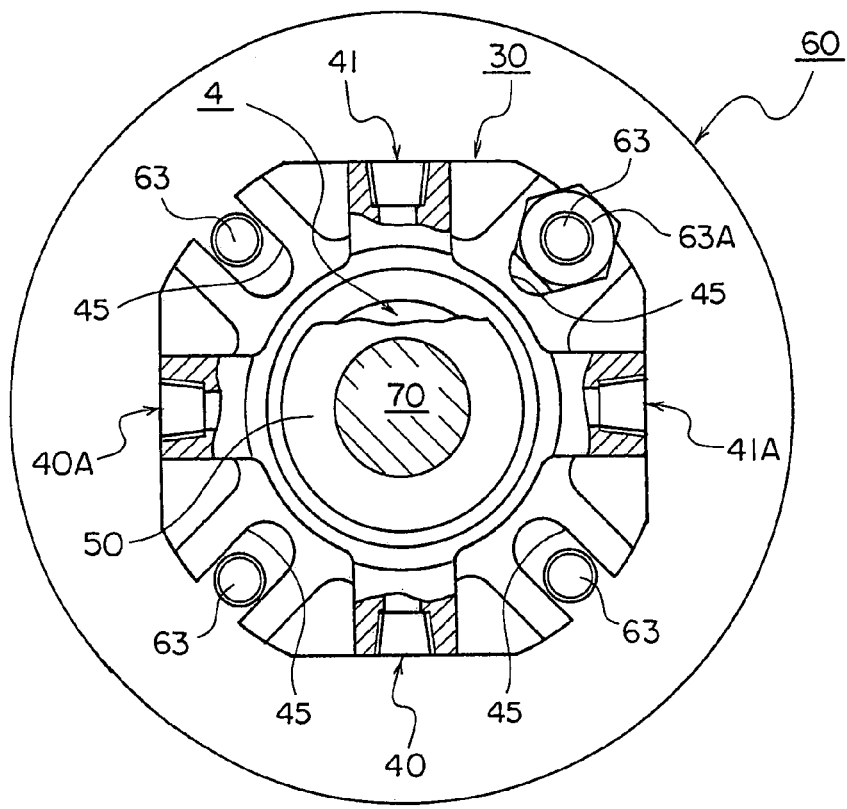
FIG. 5 is a front view of the mechanical seal device shown in FIG. 1.
Figure 6:
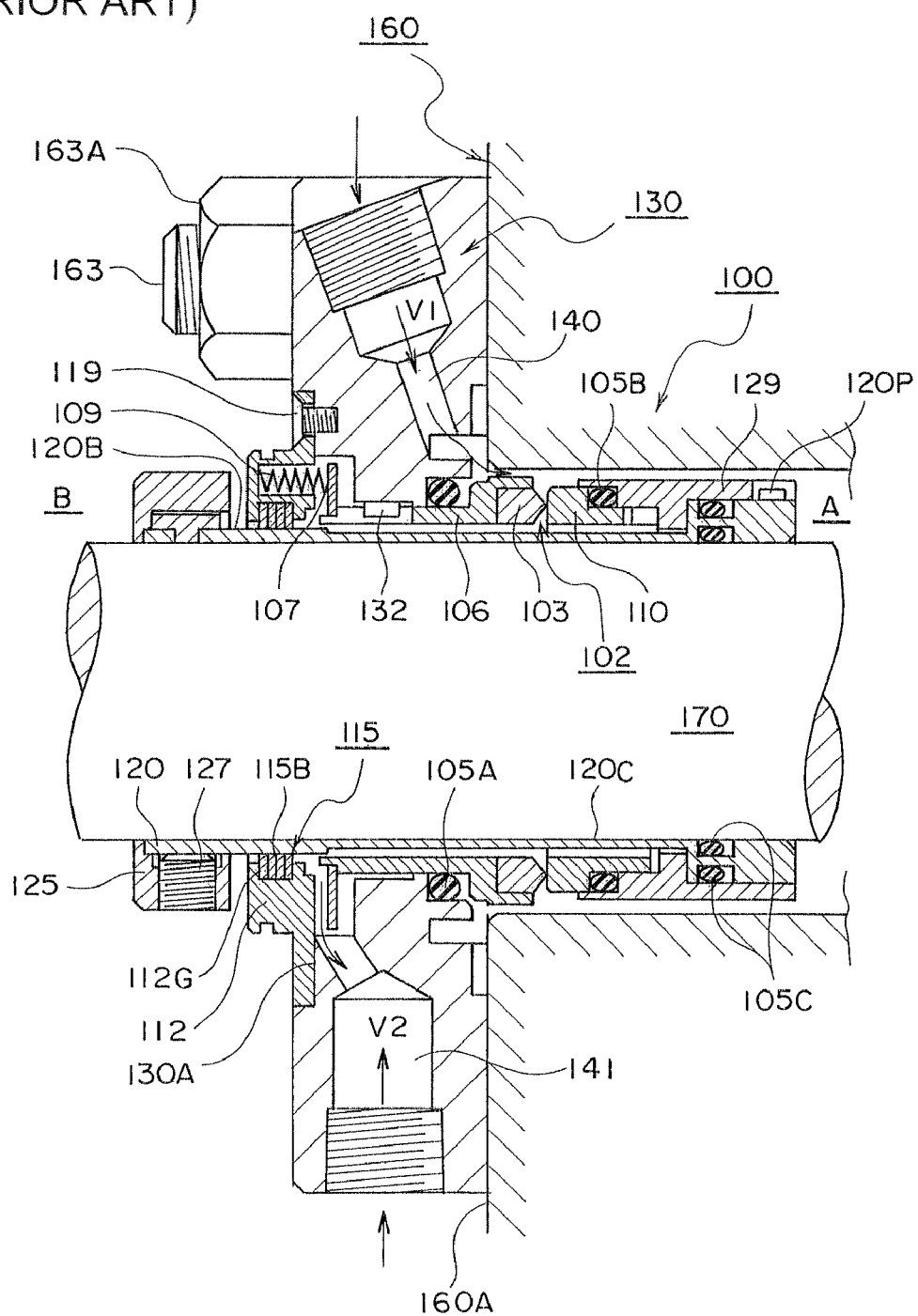
FIG. 6 is a full cross sectional view of a mechanical seal device as a prior art of the present invention.

FIG. 1 depicts a full cross sectional view of a mechanical seal device 1 of a cartridge type being installed between an apparatus main body (casing) 60 and a rotary shaft (also referred to as a shaft) 70 in order to provide a seal therebetween in which the rotary shaft 70 is fittingly inserted to the bore hole of the apparatus main body 60. Also FIG. 2 is a plain view of the packing disposed in the mechanical-seal device 1 shown in FIG. 1. Moreover FIG. 5 is a front view of the mechanical seal device 1 shown in FIG. 1. These figures will be referred to in further descriptions of the mechanical seal device 1 below.

FIG. 1 shows a mechanical seal device 1 as a first embodiment relative to the present invention. There is disposed a rotary shaft 70 extending through a shaft bore hole of an apparatus main body (casing) 60. The mechanical seal device 1 is mounted onto an outboard wall face 61 via a seal cover 30 wherein the outboard wall face 61 is located around the circumference of the shaft bore entrance of the apparatus main body 60. In the apparatus main body 60, there are four pieces of stud bolts disposed at four different places along the circumference of the outboard wall face 61. The rotary shaft 70 is supported in freely rotatable a manner by means of a bearing, not shown, which is mounted to the shaft bore. A space within the bore hole of the apparatus main body 60 corresponds to an inboard space A while the opposite (outward) the apparatus main body 60 with respect to the mechanical seal device 1 corresponds to an outboard B.

Further details on the mechanical seal device 1 will be given below by referring to FIG. 1 and FIG. 5. The seal cover 30 mounted onto the apparatus main body 60 is of a square design as shown in FIG. 5. The seal cover 30 has fixture grooves (notched slots) 45 which radially extend from the center toward four corners of the square and have open ends. The fixture grooves 45 of the seal cover 30 receive stud bolts 63 therein and fastening nuts 63A on the stud bolts 63 secures the seal cover 30 against the outboard face 61 of the apparatus main body 60. The seal cover 30 also forms an axially extending hole therewithin. Forehand portion of the seal cover 30 mounted defines an alignment portion 30T in surrounding relation to the axial hole. The alignment portion 30T is axially protruded in order to form alignment groove 30S on outer circumference thereof. Inner diameter surface of the seal cover 30 which forms a bore hole defines, from inboard A to outboard B, a fit surface 30C (a portion of inner circumferential face 30C which is to fit the stationary seal ring 3), cavity portion (hereafter referred to as annular groove) 30G and reducing face 30F. Out of these, the annular groove 30G being located between the fit surface 30C and reducing face 30F is made larger than the outer diameter of the fit surface 30C (alternatively, instead of making the annular groove 30G larger than the fit surface 30C, the annular groove 30G may have almost the same diameter as the fit surface 30C while the respective outer diameters of the stationary seal ring 3 and the rotary seal ring 10 are made smaller than the inner diameter of the fit surface 30C such that a sufficiently large space (clearance) is formed between the inner wall of the annular groove 30G and the stationary seal ring 3 and the rotary seal ring 10). Axial dimension of the annular groove 30G is made long enough to cover the majority of the stationary seal ring 3 and the rotary seal ring 10 therewithin. Moreover the reducing face 30F is disposed on the inner circumference of the alignment portion 30T so as to earn the axial dimension of the annular groove 30G.

The seal cover 30 disposes a quenching passage 40 and a drain bore hole 40A (refer to FIG. 5) therein in which the quenching passage 40 communicates through from an outer diameter face 30A to the annular groove 30G while the drain bore hole 40A communicates from the annular groove 30G to the outer diameter face 30A. Ports of the quenching passage 40 and the drain bore hole 40A are threaded for a pipe screw thread so as to be fitted to pipes, not shown. The quenching fluid (hereafter also referred to as quenching liquid) V1 fed through the pipe is supplied from the quenching passage 40 directly onto the outer diameter surfaces of a seal face (hereafter also referred to as sliding seal face) 3A and of an opposing sliding seal face 10A of a mechanical seal 2. The quenching liquid V1 thus supplied circulates within the annular groove 30G before it is ejected via drain bore hole 40A. The liquid not only provides a cooling for the sliding frictional heat generated on the sliding seal face 3A and opposing sliding seal face 10A but also cleanses contaminants stuck on the mechanical seal 2. Note that the mechanical seal 2 is referred to an assembly of a stationary seal ring 3 and a rotary seal ring 10. The seal cover 30 also disposes a flushing passage 41 which communicates through from the outer diameter face 30A to the fit surface 30C. There can be disposed in the seal cover 30, upon request, a second flushing passage 41A (see FIG. 5) which communicates from the outer diameter face 30A to either within the inner circumferential face 30C or within the annular groove 30G. The second flushing passage 41A may be replaced by second quenching passage or second drain passage in another embodiment. And a flushing fluid (purified water) V2 intermittently fed from the flushing passage 41 provides a cleansing for the inner diameter faces 3C, 10C of the stationary seal ring (first seal ring, for example) 3 and the rotary seal ring (second seal ring, for example) 10, respectively, which come to a contact with the sealed fluid. The sealed fluid here represents a chemical liquid, highly viscous liquid, a fluid containing contaminants or the like which is applied to the apparatus main body 60.

The fit surface 30C of the seal cover 30 fits a moveable face 3D of the stationary seal ring 3 in a freely moveable manner. There is disposed a first seal groove 3B on the moveable face 3D of the stationary seal ring 3 for receiving an O-ring to provide a seal between the fit surface 30C and the moveable face 3D. A portion adjacent the first seal groove 3B (inboard A side) is arranged to leave a wide clearance against the fit surface 30C for ease of cleansing sticking contaminants. As one of preferred embodiments, the moveable face 3D adjacent the first seal groove 3B (inboard A side) can be arranged in a smaller-diameter than the fit surface 30C in order to form a large clearance. Alternatively, the diameter of the moveable face 3D near the inboard A relative to the first seal groove 3B can be made approximately equal to the diameter of the fit surface 30C so as to keep the clearance between the two members small. The first seal groove 3B receives an O-ring (seal ring) 5A. Material for the O-ring 5A may be Fluoride Rubber, Nitrile Rubber, H-NBR, EPDM, Perfluoroelastomer or the like.

The stationary seal ring 3 defines the sliding seal surface 3A on an end face opposite the first seal groove 3B. Radially outward portion of the stationary seal ring 3 forms a flange 3F. The flange 3F then disposes a guide groove 3G therein. Also a fixture pin 35 is press fit into a fit bore which is disposed on the side wall in the annular groove 30G of the seal cover 30. This fixture pin 35 fits the guide groove 3G in a freely moveable manner such that the stationary seal ring 3 is allowed to move in the axial direction while it is locked in the rotational direction by means of the fixture pin 35. The seal cover 30 opposing the flange 3F disposes a plurality of recessed spring seats 30H along the circumferential direction.

Then coiled springs 9 disposed in equally spaced a manner along the circumference are received on the spring seats and provide a resiliently urging force to the stationary seal ring 3. In addition, the inner circumferential face 3C of the stationary seal ring 3 providing a passage is formed so as to leave a large clearance relative to the outer diameter face 70A of the rotary shaft 70. This is intended to ease the flushing liquid V2 fed from the flushing passage 41 of flowing under the inner circumferential face 3C of the stationary seal ring 3. This flushing liquid V2 prevents solid matters contained in the sealed fluid from sticking to the inner circumferential faces 3C, 10C and respective sliding seal faces 3A, 10A of the mechanical seal 2. This stationary seal ring 3 is made of silicon carbide, carbon, ceramics or the like.

A seal collar 50, on the other hand, disposes a fixedly fit diameter face 50C and a second seal groove 50B on inner circumference thereof. This fixedly fit diameter face 50C fixedly fits the outer diameter face 70A of the rotary shaft 70, and an O-ring 5C received in the second seal groove 50B provides a seal between the fit faces of both members. The seal collar 50 is fixed relative to the rotary shaft 70 by means of a set screw 51 screwed on the seal collar 50 whose nose end is pressed against the outer diameter face 70A of the rotary shaft 70. Then an outer circumference portion of the seal collar 50 which is located radially inward the rotary seal ring 10 defines a joint face 50D. An annular stepped wall which is disposed radially outward the joint face 50D defines a retainer wall 50S. The retainer wall 50S of the seal collar 50 then mounts drive pins 52 which are press fitted in fit bore holes disposed on the retainer wall 50S.

There is disposed an opposing sliding seal face 10A on one end of the rotary seal ring 10. The opposing sliding seal face 10A is arranged so as to be able to slide while maintaining a tight contact with the sliding seal face 3A of the stationary seal ring 3. The rotary seal ring 10 further disposes a seal-tight face 10D on outer circumference thereof. The seal-tight face 10D comes to a close proximity of the reducing face 30F of the alignment portion 30T to form a clearance C therebetween. The clearance C formed by the seal-tight face 10D mating with the reducing face 30F in a proximal relation stops the quenching liquid V1 supplied from the quenching passage 40. The rotary seal ring 10 forms a stepped face on inner diameter face thereof for a seal purpose. O-ring 5B received on the stepped face 10B provides a seal between the fit surfaces of the inner diameter face 10C of the rotary seal ring 10 and the joint face 50D of the seal collar 50. Also a pin-receiving recessed portion 10G is formed on a contact face 10E which is defined on outboard end (B side) of the rotary seal ring 10. The pin-receiving recessed portion 10G receives a drive pin 52 which is press fitted to a fit bore hole on the seal collar 50 and a relative rotational movement between the rotary seal ring 10 and the seal collar 50 is prevented accordingly. The drive pin 52 permits a rotational torque of the seal collar 50 to be transmitted to the rotary seal ring 10. This rotary seal ring 10 is made of silicon carbide, carbon, ceramics or the like.

A packing 4 is illustrated in FIG. 2 wherein the packing 4 is intended to seal the clearance C which is formed between the reducing face 30F and the seal-tight face 10D. FIG. 2 shows a front view of the packing 4. This packing 4 is designed in a ring form wherein inner diameter portion thereof defines an installation portion 4B and outer diameter portion thereof defines a seal portion 4A. The outer circumference of the packing 4 defines a seal contact face 4S while the inner circumference defines a fit contact face 4C. There are disposed mount bore holes 4H on the installation portion 4B wherein the drive pins 52 mate with the mount bore holes 4H in a seal-tight relation. The mount bore holes 4H fit the drive pins 52, and the installation portion 4B is press fit against between the contact face 10E of the stationary seal ring 10 and the retainer face 50S of the seal collar 50. Also the seal contact face 4S of the packing 4 comes to a seal tight contact with the reducing face 30F in which the contact area is located in the outboard B side of the reducing face 30F. Disposing the packing 4 thereat allows the pressure of the quenching liquid V1 to increase within the annular groove 30G. As the pressure of the quenching liquid V1 increases, contaminants prone to stick to the sliding face of the O-ring 5A tend to be pushed back, thereby exhibiting an outstanding cleansing effect. As a result, a sealing performance of the sliding seal face 3A of the stationary seal ring 3 relative to the opposing sliding seal face 10A in the axial direction is enhanced.

There is disposed a gasket 34 between the seal cover 30 and the apparatus main body 60 to provide a seal therebetween. In case of sealing between the seal cover 30 and the apparatus main body 60, the gasket 34 can be formed as shown in FIG. 1, but in order to effectively induct the flushing liquid (purified water) V2 which is fed from the flushing passage 41 to flow to the inner circumferential faces 3C, 10C, the inner diameter surface of the ring shaped gasket 34 should be kept smaller in diameter than that of FIG. 1 so as to be brought to a close proximity of the rotary shaft 70. This gasket is made of rubber, resin, rubber coated metal or the like. Therefore, the flushing liquid V2 fed through the flushing passage 41 first reaches the gasket 34, and then flows through the passage formed between the mechanical seal 2 and the rotary shaft 70 while lubricating the sliding faces and cleansing solid matters attached to the inner diameter faces of the sliding seal face 3A and its opposing sliding seal face 10A as well as to the inner circumferential faces 3C, 10C of the mechanical seal 2.

The annular groove 30G of the seal cover 30 is preferably extended in the axial direction so as to cover most of the stationary seal ring 3 and the rotary seal ring 10. The side wall of the annular groove 30G in the inboard A side is located in close proximity of the first seal groove 3B in the stationary seal ring 3. The other side wall of the annular groove 30G in the rotary seal ring 10 side reaches as far as a middle section of the rotary seal ring 10. Also the outer circumference diameter of the annular groove 30G is preferably large. Quenching liquid V1 supplied from the quenching passage 40 is directly led to the inner diameter faces of the sliding seal face 3A and the opposing sliding seal face 10A. As the annular groove 30G has a large width enough to cover the outer circumference of the stationary seal ring 3 and the rotary seal ring 10, the quenching liquid V1 flowing within the annular groove 30G exhibits outstanding performance not only in cooling effect but also in cleansing effect despite of a frictional heat caused by a relative sliding movement between the sliding seal face 3A of the stationary seal ring 3 and the opposing sliding seal face 10A of the rotary seal ring 10. This cooling and cleansing effect in the mechanical seal 2 is materialized by such a construction that the annular groove 30G permitting the quenching liquid V1 is located in close proximity of the mechanical seal 2 and that the packing 4 providing a seal against the quenching liquid V1 pushes back the quenching liquid V1 under a rotary motion.

The seal cover 30 and the seal collar 50 thus constructed are assembled and aligned with each other by means of screw bolts 59 applied to the seal cover 50 and a projected portion of a set plate 55 fittingly inserted to the alignment groove 30B of the seal cover 30. Once the rotary seal ring 10 is positioned, the seal collar 50 is secured to the rotary shaft 70 by means of socket screws 51 fastened against the rotary shaft 70. The set plates 55 one of which is shown by a virtual line are installed on the circumference of the seal collar 50 in three equally spaced a manner. These set plates 55 may be removed after the completion of assembly.

Figure 3:
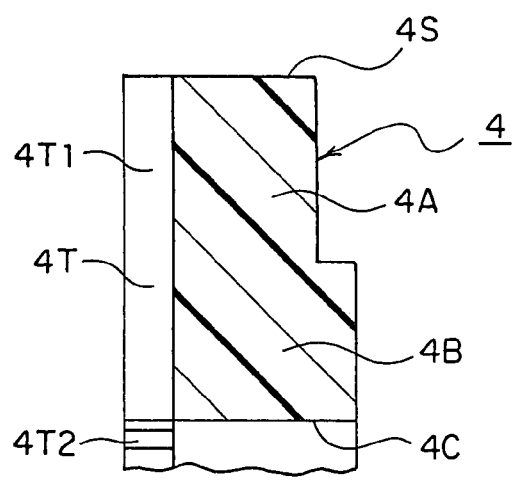
FIG. 3 is a cross sectional view of a portion of a packing as a second embodiment related to the present invention.

FIG. 3 shows a cross sectional view of a portion of packing 4 as a second embodiment related to the present invention. This packing 4 disposes discharge means 4T on ring-shaped side wall thereof in which radially extending projected portions and radially extending recessed portions are lined up alternately along the circumference. The discharge means 4T consists of projected portions 4T1 and recessed portions 4T2. Other names are the same as those of reference numerals used in FIG. 2, i.e., seal portion 4A, installation portion 4B, fit contact face 4C and seal contact face 4S. This discharge means 4T pushes the quenching liquid V1 (refer to FIG. 1) in the small clearance C back to inside the annular groove 30G and prevents contaminants attached on the seal contact face 4S from wearing the seal contact face 4S. The discharge means 4T, at the same time, pushes away the contaminants contained in the quenching liquid V1 toward annular groove 30G side, thereby improving seal ability of the packing 4 as well as providing a cooling and cleansing for the rotary seal ring 10. The packing 4 is made of resin such as Fluoride Resin, H-NBR or the like or rubber materials.

Figure 4:
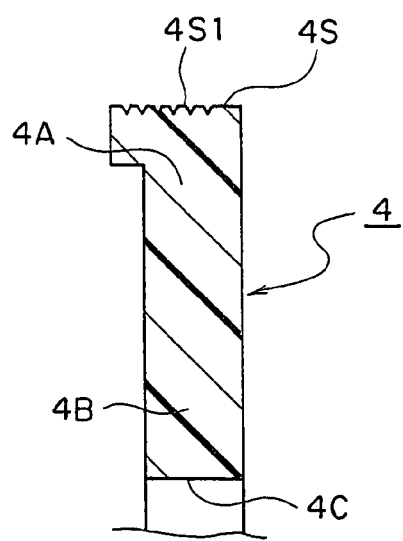
FIG. 4 is a cross sectional view of a portion of a packing as a third embodiment related to the present invention.

FIG. 4 is a cross sectional view of a portion of packing 4 as a third embodiment related to the present invention. This packing 4 has approximately the same form as that shown by the same reference numerals in FIG. 2. A difference resides in that there is disposed a discharge means 4S1 of a spiral groove design on the quenching liquid V1 (refer to FIG. 1) side of the seal contact face 4S, thereby pushing back the quenching liquid V1 enhancing seal ability of the packing 4. This packing 4 is made of Fluoride Resin.

In the mechanical seal device 1 thus constructed, the quenching liquid V1 can provide an effective cooling against sliding frictional heat generated in the mechanical seal 2 and can prevent an occurrence of thermal damage or squeaking noise at the relative seal faces 3A, 10A. The cooling effect due to the quenching liquid V1 within the annular groove 30G enhances a seal performance of the respective relative seal faces 3A, 10A. Unlike the prior art, as no sleeve is required there is no protruded member in the seal cover 30 in axial direction thereof, therefore stocking the part in part management is made simple. Sandwiching the packing 4 between the rotary seal ring 10 and the seal collar 50 makes straightforward disassembly thereof for repair as well as installation thereof for assembly. Also the number of parts required can be reduced. Moreover, the mechanical seal device 1 is expected to realize a significant simplification in assembly thereof because the seal cover 30 retaining the stationary seal ring 3 can simply be joined with the seal collar 50 retaining the rotary seal ring 10. Combination of the annular groove 30G with the packing 4 allows the quenching liquid V1 to effectively circulate around the outer circumference of the mechanical seal 2, thereby providing cleansing as well as cooling thereto. In addition, a part replacement can easily be done by dismounting the seal collar 50 from the rotary shaft 70 first, followed by straightforward disassembly of stationary seal ring 3, rotary seal ring 10 and packing 4 which are mutually fitted to each other.

While a principle of the present invention has been described above in connection with preferred embodiments of the invention, it is intended that all matter contained in the above description shall be interpreted to be illustrative and not as a limitation to the scope of the invention. It will be understood from these examples that various details of the invention may be changed or modified without departing from the scope of the invention. The scope of the present invention is determined by claims.

INDUSTRIAL APPLICABILITY

As described so far a mechanical seal device of the present invention is advantageous in that the mechanical seal device prevents problems caused by sliding frictional heat at the seal faces and is made compact in dimension and light in weight, which is useful in its application to pumps or the like for automobiles or the like. Also straightforward assembly and disassembly of the mechanical seal device makes it suitable for applications in mass-produced apparatus. Additionally, the mechanical seal device is advantageous in that it is applicable to sealing against a chemical liquid because it is outstanding in cooling, cleansing and lubricating sliding seal faces with excellent durability.

The invention claimed is:

1. A mechanical seal device for being provided in an apparatus main body mounting a shaft therethrough for effecting a seal on a circumference of said shaft, said mechanical seal device comprising:
   a) a seal cover being mounted on an outboard surface of said apparatus main body and having a fit surface to which said shaft is inserted and defining a cavity portion in an outboard side relative to said fit surface;
   b) a quenching passage communicating with said cavity portion and feeding a quenching fluid to within said cavity portion;
   c) a reducing face being disposed on said seal cover and being arranged in an annular form, said reducing face being located in said outboard side relative to said cavity portion;
   d) a first seal ring retaining a moveable face and a seal face, said moveable face being sealingly fitted with said fit surface of said seal cover in freely moveable a manner, said seal face being located within said cavity portion;
   e) a second seal ring retaining a relatively sliding seal face and a seal-tight face, said relatively sliding seal face being able to form a sealing contact with said seal face of said first seal ring, said seal-tight face being disposed on the outer circumference and facing against said reducing face; and
   f) a seal collar retaining said second seal ring in a seal-tight manner and being sealably secured to said shaft,
   g) a packing is provided to prevent said quenching fluid from leaking outboard,
   wherein said second seal ring further comprising a contact face disposed axially opposite said relatively sliding seal face;
   said seal collar further comprising a retainer face configured to oppose said contact face; and
   said packing further comprising an installation portion sandwiched between said contact face of said second seal ring and said retainer face of said seal collar,
   wherein a seal contact face opposite said installation portion is arranged in a seal-tight contact with said reducing face, thereby preventing the quenching fluid within said cavity portion from leaking outboard.

2. A mechanical seal device as claimed in claim 1 wherein said second seal ring being disposed in the inner circumferential side of said reducing face, said seal-tight face and said reducing face forming a small clearance therebetween.

3. A mechanical seal device as claimed in claim 1 wherein said packing further comprising mount bore holes, said mount bore holes being disposed in said installation portion, said mount bore holes mating with drive pins installed in said seal collar in a non-rotatable manner.

4. A mechanical seal device as claimed in claim 1 wherein said first seal ring fitting said fit surface of said seal cover and being urged in the outboard direction by means of a resilient urging means, said second seal ring fitting said seal collar, said relatively sliding seal face of said second seal ring being sealably secured to said sliding seal face of said first seal ring from the outboard side.

* * * * *